June 7, 1955          R. E. LEWIS          2,709,873

MACHINE FOR GRINDING PARABOLOIDAL SURFACES

Filed Aug. 20, 1953          3 Sheets-Sheet 1

INVENTOR
ROBERT E. LEWIS
BY
ATTORNEYS

June 7, 1955  R. E. LEWIS  2,709,873
MACHINE FOR GRINDING PARABOLOIDAL SURFACES
Filed Aug. 20, 1953  3 Sheets-Sheet 2

INVENTOR
ROBERT E. LEWIS
BY George Sipkin
J. R. Heintgen
ATTORNEYS

June 7, 1955  R. E. LEWIS  2,709,873
MACHINE FOR GRINDING PARABOLOIDAL SURFACES
Filed Aug. 20, 1953  3 Sheets-Sheet 3

INVENTOR
ROBERT E. LEWIS
BY George Sipkin
J. R. Heintzen
ATTORNEYS

United States Patent Office 2,709,873
Patented June 7, 1955

2,709,873

MACHINE FOR GRINDING PARABOLOIDAL SURFACES

Robert E. Lewis, Chicago, Ill., assignor to the United States of America as represented by the Secretary of the Navy Application August 20, 1953, Serial No. 375,585

10 Claims. (Cl. 51—58)

This invention relates to machines for grinding optical paraboloidal surfaces and more especially for machines wherein a grinding blade reciprocates over a rotating work holder.

Machines for grinding an optical paraboloidal surface by means of a flat grinding blade which moves back and forth on the rotating work piece such for example as the machine shown in Patent 995,393 to S. Witmer are known but are rather complicated. In these machines, reciprocating motion is transmitted through bearings which are alternately stressed on opposite sides so that jerky operation results. This jerky operation is caused by the changes in the thickness of the oil film in the bearings as the stresses reverse. Any wear in these bearings, of course, accentuates the jerks.

It is accordingly an object of this invention to provide a machine which grinds paraboloidal surfaces of high optical precision.

It is another object of the invention to provide a simple machine for grinding optical paraboloidal surfaces which machine is of relatively low cost and which remains in optimum working conditions for long periods of time.

Figure 1:
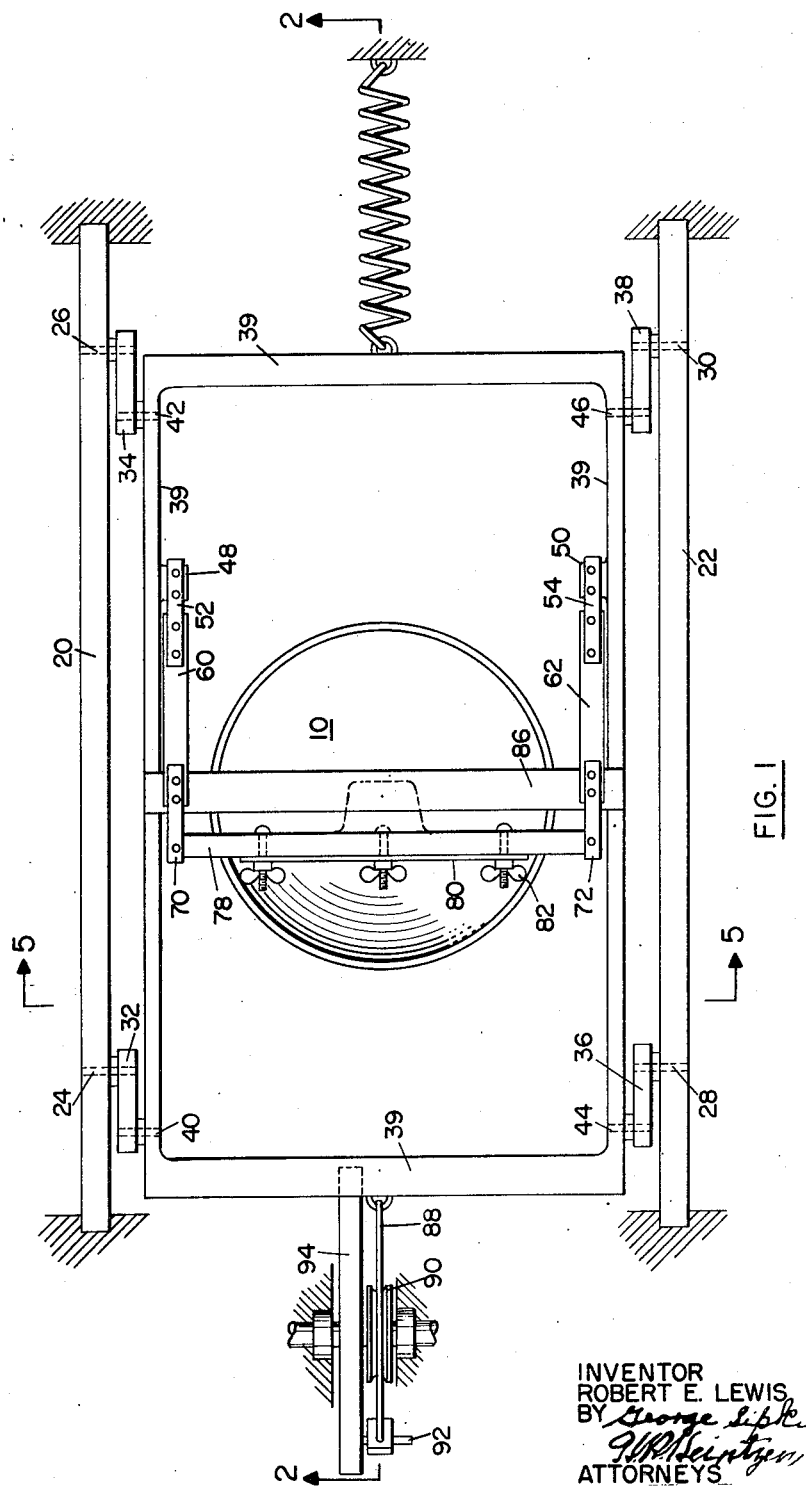
Figure 2:
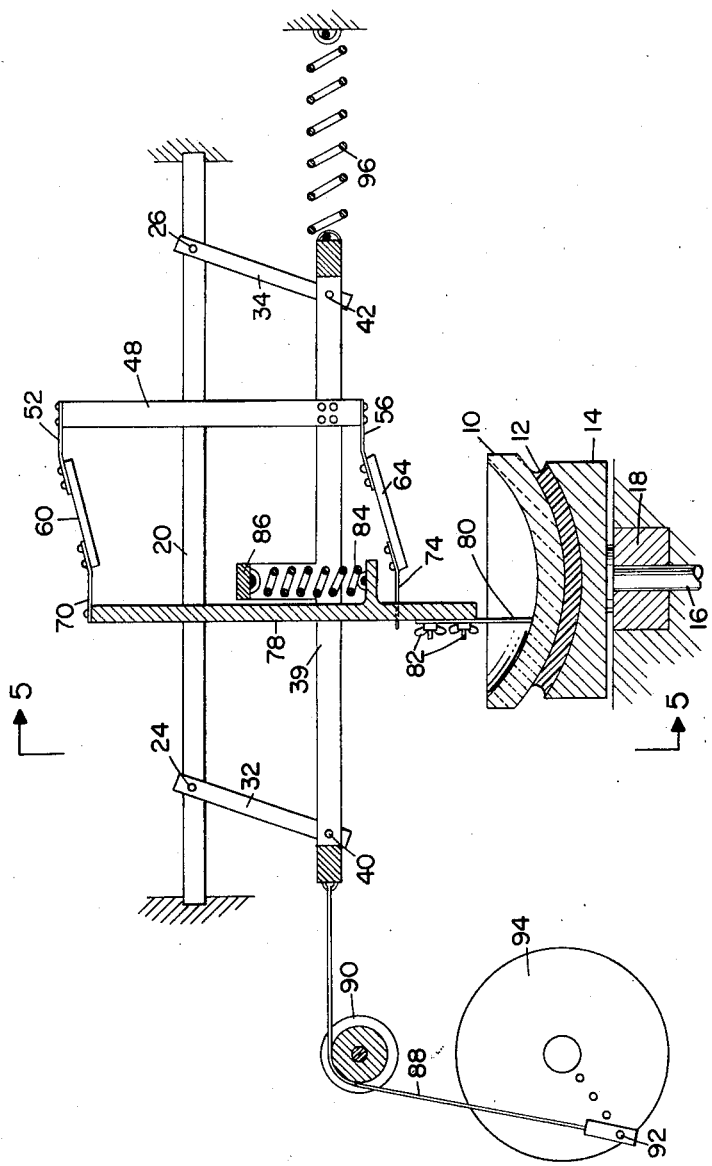
Figure 3:
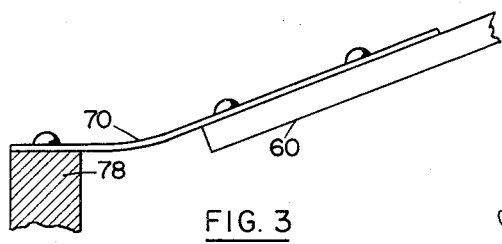
Figure 4:
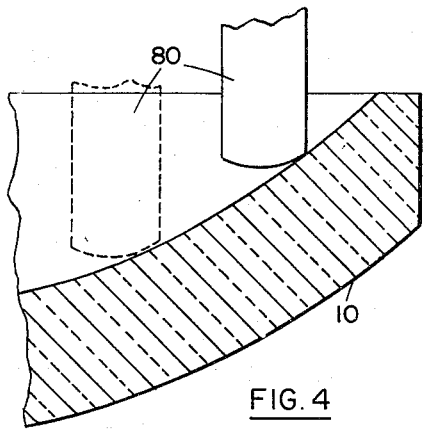
Figure 5:
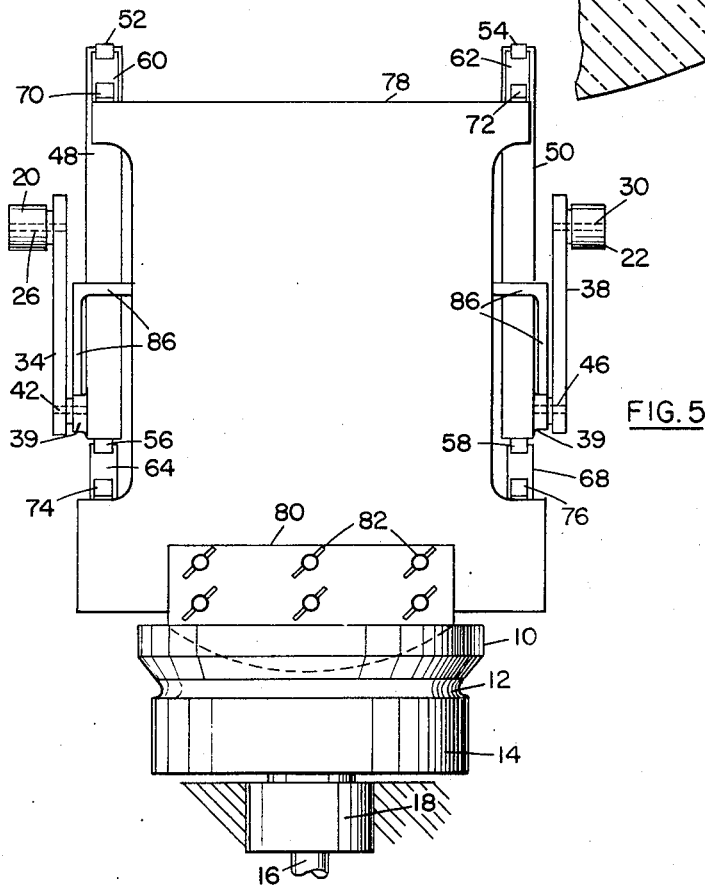

Other objects and advantages of the invention will hereinafter become more fully apparent from the following description of the annexed drawings, which illustrate a preferred embodiment, and wherein Fig. 1 is a plan view of the machine of this invention;
Fig. 2 is a sectional view on the 2—2 line of Fig. 1;
Fig. 3 is an enlarged view of a joint of this machine;
Fig. 4 is an enlarged sectional view of the grinding edge of the grinding blade resting on the paraboloidal surface; and
Fig. 5 is a view on the line 5—5 of Figs. 1 and 2.

Referring to the drawings, the reference numeral 10 designates a glass blank the upper surface of which is being ground by the machine of this invention into a paraboloid. The glass blank 10 is secured by plastic material 12 to a spindle or work support 14 affixed to the upper end of a vertical shaft 16 which is journalled for rotation in a fixed bearing 18. Two stationary bars 20 and 22 are provided above the spindle 14. Two horizontal pins 24 and 26 are located in the bar 20 and corresponding pins 28 and 30 are located in the bar 22. The pins 24, 26, 28 and 30 are parallel to one another and are positioned in a plane lying at right angles to the axis of rotation of the spindle 14.

Links 32, 34, 36 and 38 are pivoted at their upper ends on the pins 24, 26, 28 and 30 respectively. A frame 39 is journalled to pins 40, 42, 44 and 46 located at the lower ends of the links 32, 34, 36 and 38 respectively. The links 32, 34, 36 and 38 are of the same length and are parallel so that the frame 39 can swing freely across the spindle 14 in a direction generally at right angles to the axis of rotation thereof.

Uprights 48 and 50 are rigidly secured on opposite sides of the frame 39. One end of a flat strip of spring metal 52 is secured to the upper end of the upright 48 and a second strip 54 is similarly secured to the upper end of the upright 50. Similar strips 56 and 58 are secured to the lower end of the uprights 48 and 50, respectively. A link 60 is secured to the free end of the strip 52 and similar links 62, 64, and 68 are secured to the free ends of the strips 54, 56 and 58 respectively. Strips 70, 72, 74, and 76, similar to the strips 52, 54, 56, and 58, are secured to the lower ends of the links 60, 62, 64, and 68 respectively. The free ends of the strips 70, 72, 74, and 76 are secured to a blade supporting member 78. The links 60, 62, 64, and 68 are of equal length and are parallel and extend generally horizontally.

A flat grinding blade 80 is secured by wing nuts 82 to the lower end of the blade supporting member 78. The connections of the blade 80 to the uprights 48 and 50 is such that when the latter are stationary, the motion of the blade 80 is restrained to a motion generally parallel to the axis of the spindle 14. The blade 80 furthermore is at all times parallel to this axis. The grinding blade 80 is biased by gravity towards the blank 10, but this bias is partially offset by a tension spring 84. The spring 84 is secured at its upper end to a yoke 86 attached to the frame 39 and at its lower end to the blade supporting member 78. A member for adjusting the tension of the spring 84 may be provided. The blade 80 is moved back and forth over the rotating spindle 14 by a cord 88 which engages one end of the frame 39, passes over a pulley 90 and then engages a pin 92 on a rotating wheel 94. The cord 86 acts in opposition to a spring 96 which engages the other end of the frame 39.

The grinding action of the blade 80 on the glass blank 10 is well understood in the art. The grinding blade 80 as well as the glass blank 10 wear during the grinding operation, the blade assuming a rounded lower edge as shown in Fig. 4. In the other direction the blade assumes a parabolic shape of the same characteristics as the paraboloidal surface of glass blank 10 as best shown in Fig. 5.

The distance between the pivots on the links 32, 34, 36, and 38 is preferably equal to the radius of a sphere which most closely approximates the paraboloidal surface of the glass blank 10 being ground so that the flexing in the metal strips 52, 54, 56, 58, 70, 72, 74, and 76 is at a minimum. Wear in the pins 24, 26, 28, 30, 40, 42, 44, and 46 is at minimum because these pins do not transmit power to the grinding blade 80. Wear in these pins furthermore has little effect on the accuracy of the grinding operation because the strains on these pins are always in the same general direction, the strain being mainly downward to support the weight of the frame 39 and the supporting structure of the grinding blade 80. The power for grinding is transmitted to the blade 80 directly by the frame 39 through the spring metal strips 70, 72, 74, 76, 52, 54, 56, and 58. These strips do not cause jerky operation of the apparatus. Furthermore, if the linkage supporting the frame 39 is properly chosen there is a minimum of motion in the strips.

It will be apparent that this invention provides a simple mechanism for grinding a paraboloidal surface which mechanism is but little affected by wear and therefore retains its precision over long periods of usage.

Obviously many modifications and variations of the present invention are possible in the light of the above teachings. It is therefore to be understood that within the scope of the appended claims the invention may be practiced otherwise than as specifically described.

What is claimed is:

1. A machine of the class described, comprising a work support adapted and arranged to rotate on an axis, a body secured in fixed relationship with respect to said axis and spaced from said work support, a member, a first parallel motion mechanism joining said member to said body, said parallel motion mechanism restraining the motion of said member to a motion generally at right angles to said axis, a tool holder, and a second parallel motion mechanism for joining said tool holder to said member, said second parallel motion mechanism comprising parallel links, each of said links having one end secured to said member through flat spring-like material, the other end of each of said links being secured through flat spring-like material to said tool holder, said second parallel motion mechanism being adapted and arranged to restrain said tool holder with respect to said first member to a motion generally parallel to said axis.

2. The machine defined in claim 1 wherein said first parallel motion mechanism comprises parallel links of equal lengths, each of said links being pivoted at one end to said body and at the other end to said member.

3. The machine defined in claim 2 including means for biasing said tool holder toward said work support and means for moving said tool holder back and forth over said work support.

4. The machine defined in claim 3 wherein said means for moving said tool holder comprises means for biasing said member in a direction at right angles to said axis and means for periodically moving said member in opposition to said biasing means.

5. In a machine of the class described, the combination of a work support adapted and arranged to rotate on an axis, a body secured in fixed relationship with respect to said axis and spaced from said work support, a first and a second pivot pin secured to said body, the axes of said first and second pivot pins being parallel to one another and lying in a plane at right angles to the axis of rotation of said work support, a first and a second member journalled on said first and second pivot pins respectively, each of said first and second members having a third and a fourth pivot pin secured thereon respectively, a third member journalled on said third and fourth pivot pins, the axis of said third and fourth pivot pins being parallel to the axes of said first and second pivot pins and together with the axes of said first and second pivot pins forming the points of a parallelogram in a plane at right angles to the axes of said pivot pins, a tool holding member secured to said third member for movement with respect thereto in a plane at right angles to the axes of said pivot pins, and in a direction generally parallel to the axis of rotation of said work support, said movable securement comprising at least two rigid members each secured at one of their ends to said third member and at the other of their ends to said tool holding member, each of said securements of said rigid members to said third member and to said tool support comprising a strip of flat spring material adapted to flex when said tool supporting member moves in said direction.

6. The machine defined in claim 5 wherein said fixed member, said first, second, and third members, said pivot pins, said tool holding member and the securement thereof being so positioned and arranged that a grinding tool held in said tool holding member is movable across said work support.

7. The machine defined in claim 6 comprising means for moving said tool holding member back and forth across said work support.

8. The machine defined in claim 7 comprising means for biasing said tool holding member toward said work support.

9. The machine defined in claim 7 wherein said moving means engages said third member.

10. The machine defined in claim 8 wherein said moving means comprises a resilient member for biasing said third member in one direction and a tension member for moving said third member against the action of said resilient member.

References Cited in the file of this patent

UNITED STATES PATENTS

| | | |
|---|---|---|
| 2,280,379 | Cramer | Apr. 21, 1942 |
| 2,435,126 | Burch | Jan. 27, 1948 |
| 2,458,384 | Jeffree | Jan. 4, 1949 |